(12) United States Patent  
Wong

(10) Patent No.: US 8,784,666 B2  
(45) Date of Patent: Jul. 22, 2014

(54) INTEGRATED SPIN SYSTEMS FOR THE SEPARATION AND RECOVERY OF GOLD, PRECIOUS METALS, RARE EARTHS AND PURIFICATION OF WATER

(71) Applicant: Alfred Y. Wong, Los Angeles, CA (US)

(72) Inventor: Alfred Y. Wong, Los Angeles, CA (US)

( * ) Notice: Subject to any disclaimer, the term of this patent is extended or adjusted under 35 U.S.C. 154(b) by 0 days.

(21) Appl. No.: 13/663,751

(22) Filed: Oct. 30, 2012

(65) Prior Publication Data

US 2013/0047783 A1    Feb. 28, 2013

Related U.S. Application Data

(63) Continuation-in-part of application No. 12/783,550, filed on May 19, 2010, now Pat. No. 8,298,318.

(60) Provisional application No. 61/179,625, filed on May 19, 2009.

(51) Int. Cl.  
*B03C 1/00* (2006.01)

(52) U.S. Cl.  
USPC ................. 210/695; 210/748.01; 210/222

(58) Field of Classification Search  
USPC ............ 95/28, 78; 96/1–3, 61; 210/222, 223, 210/243, 695, 748.01  
See application file for complete search history.

(56) References Cited

U.S. PATENT DOCUMENTS

| 4,046,527 | A |   | 9/1977  | Kistemaker |          |
|-----------|---|---|---------|------------|----------|
| 4,090,855 | A |   | 5/1978  | Hora et al. |         |
| 4,661,327 | A | * | 4/1987  | Horton ............................ 423/7 |
| 4,940,550 | A | * | 7/1990  | Watson .......................... 210/695 |
| 5,043,070 | A | * | 8/1991  | Hwang .......................... 210/634 |
| 5,968,231 | A |   | 10/1999 | Parmentier et al. |       |
| 6,096,220 | A |   | 8/2000  | Ohkawa |                  |
| 6,099,738 | A | * | 8/2000  | Wechsler et al. ............. 210/695 |
| 6,214,223 | B1 |  | 4/2001  | Ohkawa |                  |
| 6,217,776 | B1 |  | 4/2001  | Ohkawa |                  |
| 6,248,240 | B1 |  | 6/2001  | Ohkawa |                  |
| 6,251,281 | B1 |  | 6/2001  | Ohkawa |                  |
| 6,251,282 | B1 |  | 6/2001  | Putvinski et al. |         |

(Continued)

FOREIGN PATENT DOCUMENTS

JP        56-40424 A      4/1981

*Primary Examiner* — Duane Smith  
*Assistant Examiner* — Sonji Turner  
(74) *Attorney, Agent, or Firm* — Vorys, Sater, Seymour and Pease LLP; Vincent M DeLuca

(57) ABSTRACT

A system and method are provided for the extraction of gold and other precious metals and elements from ore, as well as purification of water. Heavy elements are separated from lighter elements during the rotation of any conductive liquid in a chamber. To provide proper conductivity seawater can be used as the main conductive liquid. An electric field and hence a current is generated in a radial direction in a magnetic field generated in an axial direction, perpendicular to the radial direction, with respect to a chamber. The conductive liquid is provided to the chamber and is subjected to the current, and the conductive liquid is caused to rotate in the chamber by the current interacting with the magnetic field. Due to the Lorentz force, proper rotation is achieved without any mechanical motion. Rotation of the liquid in the chamber causes separation of heavy elements from light element caused by centrifugal forces. This system and method is also effective to clean up pollution of past and existing mines by decomposing hazardous leaching solutions such as cyanides into non-harmful elements, for example hydrogen, carbon and nitrogen.

19 Claims, 3 Drawing Sheets

(56) References Cited

U.S. PATENT DOCUMENTS

| | | |
|---|---|---|
| 6,322,706 B1 | 11/2001 | Ohkawa |
| 6,515,281 B1 | 2/2003 | Ohkawa |
| 6,726,844 B2 | 4/2004 | Ohkawa et al. |
| 6,730,231 B2 | 5/2004 | Putvinski |
| 6,787,044 B1 | 9/2004 | Freeman et al. |
| 8,298,318 B2 * | 10/2012 | Wong ................................. 95/28 |
| 2005/0173630 A1 | 8/2005 | Ohkawa |
| 2010/0294666 A1 * | 11/2010 | Wong ............................ 204/557 |
| 2011/0188623 A1 * | 8/2011 | Wong ............................ 376/130 |

* cited by examiner

US 8,784,666 B2

INTEGRATED SPIN SYSTEMS FOR THE SEPARATION AND RECOVERY OF GOLD, PRECIOUS METALS, RARE EARTHS AND PURIFICATION OF WATER

CROSS-REFERENCE TO RELATED APPLICATIONS

This application is a continuation-in-part under 35 U.S.C. 120 of application Ser. No. 12/783,550 filed May 19, 2010, now U.S. Pat. No. 8,298,318, which claims priority under 35 U.S.C. 119(e) from provisional application Ser. No. 61/179,625 filed May 19, 2009, the disclosures of which are incorporated herein by reference in their entireties.

FIELD

This disclosure generally relates to recovery of gold, other precious metals and elements such as rare-earths from ores, and water purification, using electromagnetic forces.

BACKGROUND

The recovery of gold and other precious metals from ore encompasses a broad range of scientific research and is economically important to the United States. In mining applications, a large percentage of fine gold particles alloyed with various other materials remain uncovered after processing. These gold pieces are typically covered by a layer of silica that prevents the gold from being detected by conventional methods. Due to this silica layer, conventional leaching methods cannot penetrate through to the gold pieces and recover the complete amount of gold contained within the ore. Therefore, a new method to uncover and retrieve gold that reduces waste is essential. Also, there are many harmful safety and environmental concerns with past and present mining techniques, such as the use of cyanide for gold extraction. The present method also addresses the remediation of wastes by providing means of disintegrating cyanide molecules into non-harmful elements. Another application of the present inventive method is water purification which is vital to the economy of the United States, as well as to many rural environments across the world. In fact, in multiple locations around the world, the demand for fresh water exceeds supply. Since current water purification techniques require excessive amounts of energy, these methods have not been adapted or implemented as a solution to the clean water deficit. Even in the United States, the supply of clean water is inadequate to accommodate the rapidly growing demand. A stable domestic supply of clean water can isolate the United States from other countries that are still relying on expensive methods for water purity. Therefore, the demand for a new method and process applicable to water purification as well as precious metal mining is evident.

SUMMARY

Embodiments of the present disclosure relate to a system and methods for the extraction of gold and other precious metals, as well as purification of water. Through theory and experimentation it has been confirmed that heavy elements can be separated from lighter elements during the rotation of any conductive liquid. To provide proper conductivity for rotation seawater or similar conductive fluid is used as a main component in all solutions.

An electric field and hence a current is generated in a radial direction in a magnetic field generated in an axial direction, perpendicular to the radial direction, with respect to a chamber. The liquid is provided to the chamber and is subjected to the current and ionized, and the ionized liquid is caused to rotate in the chamber by the magnetic field. Due to the Lorentz force, proper rotation is achieved without any mechanical motion. Rotation of the liquid in the chamber causes separation of heavy elements from light elements caused by centrifugal forces.

The foregoing and other objects, features and advantages of the present disclosure will become more readily apparent from the following detailed description of exemplary embodiments as disclosed herein.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

The disclosure relates to systems and methods for the separation and recovery of gold and other precious metals, as well as water purification, by use of ionized particle rotation by electromagnetic forces to create high velocity centrifugal forces.

Figure 1:
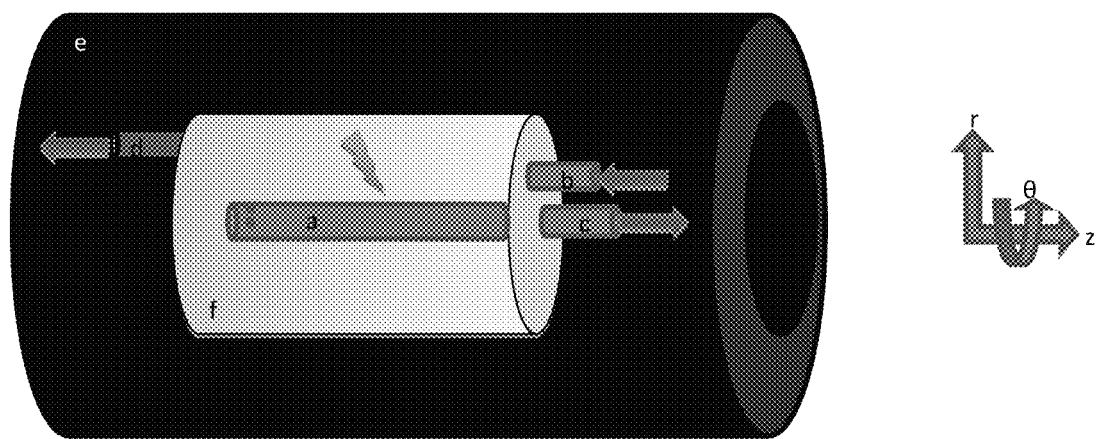
FIG. 1 illustrates an exemplary horizontal system for the separation and recovery of metals, as well as water purification according to one embodiment. This system is operated in a superconducting magnet, labeled (e). A stainless steel shroud (f) is placed within the superconducting magnet. This shroud is closed with two ports pumping out solution (d & c) and one port feeding in solution (b). Within this shroud, an electrode (a) is placed which is biased with respect to the shroud wall.

FIG. 1 illustrates an exemplary system for the separation and recovery of precious metals such as gold, other elements such as rare earth elements, and for water purification. The system can include an input port for solution that is driven by a diaphragm pump or peristaltic pump or other EM driven pumps without mechanical moving parts, a gaseous product output called the inner return that is driven by a diaphragm pump, an output port for heavy elements called the outer return, a stainless steel shroud, a central platinum electrode, a superconducting magnet or a permanent magnet, and a power supply. This system can be applied in two configurations: vertical or horizontal. This process can be conducted at atmospheric pressures and there is no need for a vacuum chamber. This system is operated in a superconducting magnet, labeled (e). A stainless steel shroud (f) is placed within the superconducting magnet. This shroud is closed with two ports pumping out solution (d & c) and one port feeding in solution (b). Within this shroud, an electrode (a) is placed which is electrically biased with respect to the shroud wall.

A superconducting magnet (e) is used to generate a magnetic field in the axial direction Z perpendicular to the radial direction, while the electric field is generated by the power supply in the radial direction. The current generated from the power supply in the radial plane perpendicular to the magnetic field in the axial plane induces a rotational force about the Z axis. This force is called the Lorentz Force, represented by the following formula: $F = J \times B$, where F is the rotational force (Lorentz Force), J is the current density and B is the magnitude of the magnetic field. The rotational force is dependent on the transfer of ions from the electrode to the wall of the outer shroud (f). Therefore, seawater was adapted to contribute the conductivity necessary for rotation. Seawater contains the charges necessary to drive the electromagnetic rotation in the system. These are hydrated charges, charges surrounded by electric dipoles of water and do not recombine, because hydration results in a lower energy state.

It is also very inexpensive and convenient to use in the leaching process with ores. Mixing seawater with ores allows for proper hydration and electrical preparation for rotation. During this process, hydrogen gas and chlorine gas are created as a byproduct and pumped out of the inner return of the shroud (f).

Figure 2:
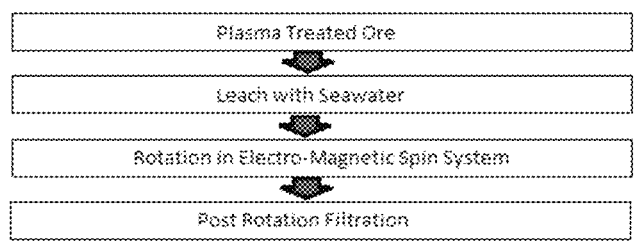
FIG. 2 illustrates a flow chart of an exemplary method for the separation of heavy metals to attain recovery of precious metals such as gold, as well as other elements, from a fluid.

FIG. 2 illustrates a flow chart of an exemplary method for the separation of heavy metals or elements to attain clean water, as well as recovery of gold or other precious metals. As shown, in a first step the ore is subjected to a plasma torch treatment. For mining applications, plasma torch treatment preferably should be performed on the ore prior to leaching. In this process, the ore is bombarded by a plasma to crack the silicon shell layer that encapsulates gold and other precious metals. This allows the leaching solution to penetrate the outer shell, reaching into the core of the ore. Next, the treated ore is leached with seawater. Precious metals are dissolved into the non-toxic leaching solution and carried out by the solution. In a third step as shown in FIG. 2, this "pregnant" conducting solution is then rotated in an electromagnetic separation system (EMSS) as shown in FIG. 1. The passage of current in a strong magnetic field produces an azimuthal rotation and the subsequent centrifugal force. Treatment will enable rotation and other processes to fully concentrate and recover the gold from the ores. Finally, as shown in FIG. 2, the fluid is subjected to post-rotation filtration.

Using the system illustrated in FIG. 1, extremely high rotation velocities can be achieved that directly contribute to an extremely high separation efficiency, as shown in the following equation:

$$q(r) + 1 = \exp\left(\frac{\omega^2 r^2 \Delta m}{2kT}\right)$$

Wherein r is the separation factor, $\omega$ is the rotation rate, r is the radius, $\Delta m$ is the species mass difference, k is the Boltzmann constant and T is the temperature. The equation shows that the separation efficiency depends exponentially on the square of the rotation velocity and the difference in mass between species to be separated. The above equation is derived from balancing the centrifugal force against the pressure gradient force. The buildup of pressure gradients against the outer wall is dependent on mass and contributes to an ideal separation inside this electromagnetic-driven centrifuge which can have an arbitrary large size, unlike conventional centrifuges driven by mechanical rotors. The size of a conventional centrifuge is limited by mechanical stresses to tens of centimeters.

Rotation and current are the two main factors that contribute to the emergence of metals in atomic forms. Centrifugal forces, local heating by electrical current, micro-turbulence as well as molecular collisions contribute to the disintegration of all large molecules present in the solution being rotated. In the case of water purification, these large molecules can be bacteria and toxic waste often found in seawater. It is believed that by pulsed or oscillating rotations these bacteria molecules (which are about 10 μm in size) are affected by shear forces which break them down to the atomic scale. Therefore, the toxicity of these molecules is removed through rotation at high velocities without the need of expensive membranes. Pulsed rotation is achieved by varying the current and voltage from a lower state to a higher state during rotation. Desalination is accomplished by separation of salt molecules through rotation.

Figure 3:
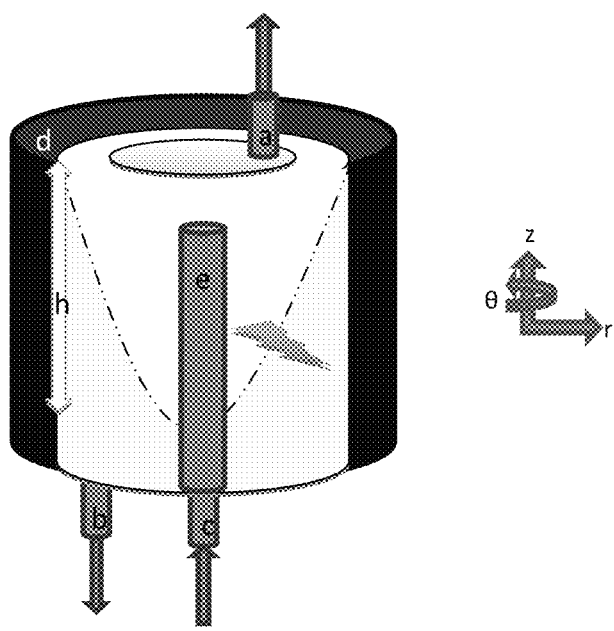
FIG. 3 depicts an exemplary vertical system for the separation and recovery of metals, as well as water purification. This system uses a permanent magnet (d) to provide adequate rotation. The system uses two diaphragm pumps, one to pump out the light elements from the top (a) and one to feed in the solution from the bottom (c). Gravitational forces contribute to the release of solution from the bottom return (b). The central platinum electrode is shown (e) as well as the height of the meniscus (h).
Figure 4:
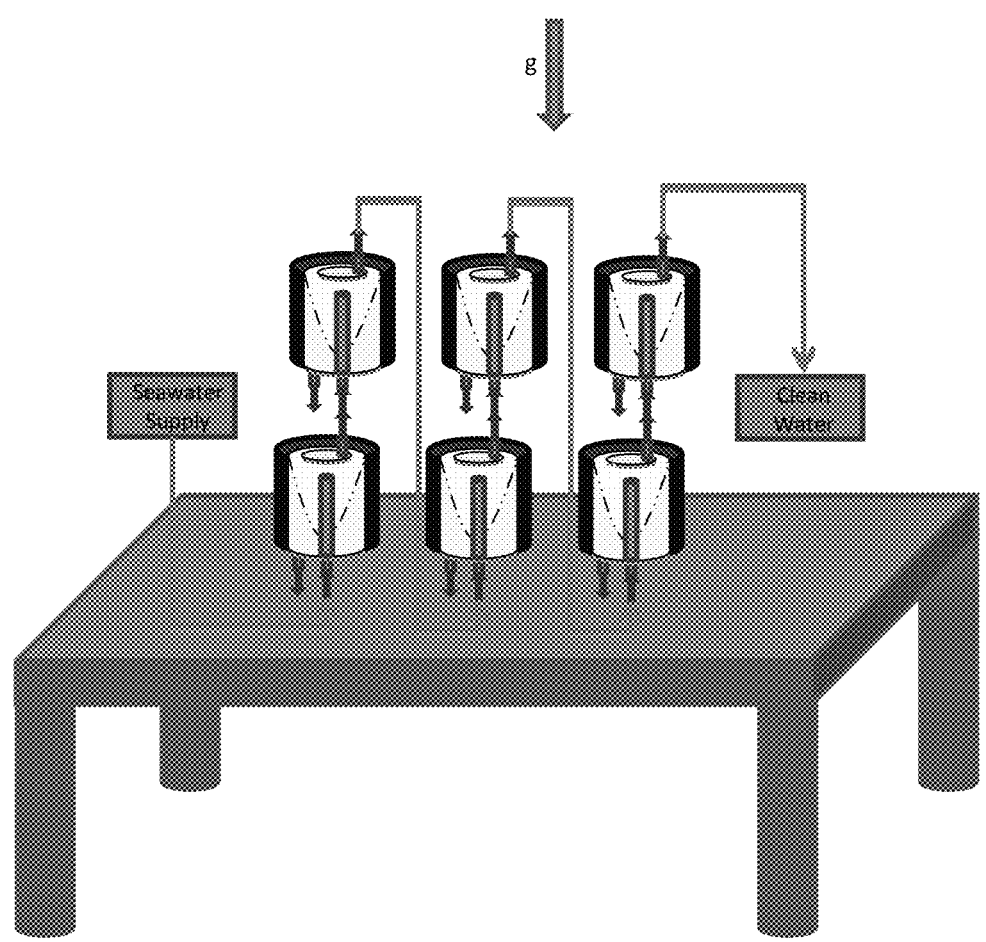
FIG. 4 illustrates the ability to create an array of vertical systems to achieve water purification or concentration of precious metals.

The EM rotation and separation process can be conducted in both vertical or horizontal superconducting magnets, and permanent magnets as shown in FIG. 1 and FIG. 3. FIG. 3 depicts an exemplary vertical system for the separation and recovery of metals, as well as water purification. This system uses a permanent magnet (d) to provide adequate rotation. The system uses two diaphragm pumps, one to pump out the light elements from the top (a) and one to feed in the solution from the bottom (c). Gravitational forces contribute to the release of solution from the bottom return (b). The central platinum electrode is shown (e) as well as the height of the meniscus (h). The advantage of a superconducting magnet is a greater and more uniform magnetic field. The disadvantage is that these large magnets are not mobile, whereas a permanent magnet can be transported to any location with ease. In regards to the application of the orientation to the system, the horizontal configuration with a permanent magnet produces the finest results. FIG. 4 shows an array of vertical systems to achieve water purification or concentration of precious metals.

In the horizontal system (FIG. 1), due to the centrifugal forces, the lightest particles (i.e. atoms and light molecules in a gas) are trapped in the center of the system while the heavy elements are pushed to the wall of the rotator. The gas, along with some fluid containing only light elements, is pumped out from the center (c) leaving all the toxins and heavy elements to the outer return (d). This is the basic principle governing the clean water production system. The water from the center contains no heavy metals/toxins, and the water from the outer return can be recycled through the system to produce cleaner water. Colloids have been observed to precipitate out from the water collected from the outer edge of the chamber after rotation and left standing in a container. Therefore water from the outer edge also can be used after suitable filtration by gravity or other methods of filtering and decantation.

In the vertical system, gravity pulls the heavy particles down towards the bottom of the centrifuge (b), as well as to the wall of the shroud. The rotation in this system forms a meniscus that is dependent on the rate of rotation, which is in turn related to the current. As current increases, rotation rate increases and therefore the height of the meniscus (h) increases according to the following formula:

$$n(m, r, h) = n_0 e^{\frac{\omega^2 r^2 m}{2kT}} e^{\frac{-mgz}{kT}}$$

where m is mass, ω angular velocity, r is radius, g is gravity, z is height, k is Boltzmann's constant and T is temperature In mining applications, the vertical system can be used to separate elements according to their vertical positions along the external shroud. This is a method of concentration and separation. Both systems are able to produce similar results for water purification as well as mining applications. A compact module can be designed using permanent magnets and transported to needed locations for water purification, as well as next to mining plants. These modules form an array for series or parallel operation. In the case of series operation, each outlet is sent forward for further purification. A successive or tandem operation is equivalent to the purification inside one single unit of a larger diameter. The parallel operation allows for a larger throughput.

Since the fluid contains charged particles, the fluid can be moved or rotated in the chamber by imposed electric and magnetic fields which are perpendicular to each other. These features allow both monitoring the flow rate and replacing of a mechanical pump as the driver of fluid flow in the system. Therefore the principle of electromagnetic drives extends to all associated mechanical operations, resulting in saving of cost and space.

The configuration of this Integrated Spin System also lends itself to the Magnetic Resonance Imaging (MRI) method which can perform 3D imaging of various elements and compounds during operation. This allows in-situ imaging while the fluid undergoes rotation. It gives the operator the knowledge of locations of separated elements, thereby optimizing the process by changing relevant control parameters.

The present method and system also can be used to clean up existing hazardous sites containing hazardous leaching solutions. Such hazardous leaching solutions, which may contain hazardous substances such as cyanides, can be decomposed into non-harmful elements through rotation and the passage of currents through the solution.

Main Points
1. Particle rotating technology with EM drive, i.e. no moving parts.
2. Seawater is a very convenient and inexpensive fluid for dealing with ores, as it contains charges. Hydration of ores by seawater provides natural charges inside the fluid (e.g. Na+ and Cl−). Other elements or solutes can be added to seawater to control the pH, conductivity and other characteristic of the solution. Such designs optimize the operation of the EMSS process.
3. The solution is inexpensive. On average seawater contains about 3.5% by weight of salt, which means that every kilogram (roughly one liter by volume) of seawater has approximately 35 grams of dissolved salts. This provides the necessary ions for proper rotation of the fluid by EM for separation of elements. It also provides elements of hydrogen and chlorine in the outputs.
4. Fluid rotation and current bring out metal atoms. Centrifugal forces, local heating by electrical current and collisions among atoms and molecules destroy large molecules which are the bacteria and toxic wastes. Membranes are not needed.
5. Pre-treatment of ores by plasma torches is necessary to avoid encapsulation by silicon. Treatment will enable the solution to go into the core of the ores, for gold mining purposes.
6. The system and method involving rotation and currents can be used to clean up existing hazardous sites containing such leaching solutions which can be decomposed into non-harmful elements through rotation and the passage of currents through the solution.
7. This Integrated Spin System can be induced by oscillating voltages to contain micro-turbulences and shears between different rotating layers. This shear force causes breakup of large molecules into elements. The sharp spatial gradient near boundaries of the process chamber also induce breakup of large molecules.
8. Not all components of the fluid need be charges. Only a minor component of the fluid carries the current and all the other components will experience the electromagnetic force through collisions with charged components and each other. Thus rare-earth elements like other non-conductors or semi-conductors can be separated.
9. The fluid can be a combination of gases, liquids and solids in suspension.

All of the systems, methods and compositions disclosed and claimed herein can be made and executed without undue experimentation in light of the present disclosure. While systems, methods and compositions have been described in terms of preferred embodiments, it will be apparent to those of skill in the art that variations may be applied to the systems, methods and compositions and in the steps or in the sequence of steps of the methods described herein without departing from the concept, spirit and scope of the invention. The subject matter that is intended to be within the spirit of this disclosure is set forth in the following claims.

What is claimed is:

1. A method for separation of heavy elements from a fluid, comprising:
   providing at least one target electrically conductive fluid containing ionizable components and further comprising at least a plurality of heavy elements;
   introducing said target fluid into a chamber;
   generating an electric field in a first direction of said chamber;
   generating a discharge current in said chamber to at least partially separate electric charges of said ionizable components in the target conductive fluid, thereby ionizing the conductive fluid;
   generating a magnetic field in a second direction of said chamber perpendicular to the first direction to induce rotation of said ionized conductive target fluid about an axis of said chamber; and
   recovering at least one heavy element from said rotating fluid.

2. The method of claim 1, wherein said fluid is water and said heavy elements comprise impurities in said fluid.

3. The method of claim 1, wherein said fluid contains metal ore, and said heavy elements comprise at least one precious metal in said ore.

4. The method of claim 3, further comprising subjecting said metal ore to a plasma torch treatment, and leaching said treated metal ore with said fluid prior to rotation of said fluid.

5. The method of claim 4, wherein said fluid is seawater.

6. The method of claim 3, wherein said at least one precious metal is gold.

7. The method of claim 1, wherein said fluid is a hazardous leaching solution, and said rotation and passage of current through the solution causes hazardous elements in said leaching solution to be decomposed into non-harmful elements.

8. Apparatus for recovering heavy elements from a target conductive fluid containing ionizable components and further comprising at least a plurality of heavy elements, comprising:
   a chamber;
   a voltage supply for establishing a voltage difference within said chamber, wherein said voltage difference at least partially separates and moves electric charges of said ionizable components in said target conductive fluid introduced into said chamber; and
   a magnet for generating a magnetic field in said chamber in a direction perpendicular to said voltage difference, said magnetic field causing said ionized conductive target fluid to rotate within said chamber in a direction about an axis of said chamber so as to separate at least one heavy element within said fluid from lighter elements of said fluid;
   wherein at least one heavy element is extracted from said chamber from said rotating fluid.

9. The apparatus of claim 8, wherein said fluid is water and said heavy elements comprise impurities in said fluid.

10. The apparatus of claim 8, wherein said fluid contains metal ore, and said heavy elements comprise at least one precious metal in said ore.

11. The apparatus of claim 10, further comprising subjecting said metal ore to a plasma torch treatment, and leaching said treated metal ore with said fluid.

12. The apparatus of claim 11, wherein said fluid is seawater.

13. The apparatus of claim 10, wherein said at least one precious metal is gold.

14. The apparatus of claim 11, wherein the leaching fluid is made to contain charges through mixing with seawater or other solutions containing hydrated charges.

15. The apparatus of claim 10, further comprising a magnetic resonance imaging apparatus for imaging of elements in said fluid.

16. The apparatus of claim 8, wherein the applied voltage has an oscillating component, which induces turbulence of various scale lengths inside the rotating fluid.

17. The apparatus of claim 8, wherein said fluid is a hazardous leaching solution, and said rotation and passage of current through the solution causes hazardous elements in said leaching solution to be decomposed into non-harmful elements.

18. The method of claim 1, wherein said fluid is a combination of gases, liquids and solids in suspension.

19. The apparatus of claim 8, wherein said fluid is a combination of gases, liquids and solids in suspension.

* * * * *

UNITED STATES PATENT AND TRADEMARK OFFICE
CERTIFICATE OF CORRECTION

| | | |
|---|---|---|
| PATENT NO. | : 8,784,666 B2 | Page 1 of 1 |
| APPLICATION NO. | : 13/663751 | |
| DATED | : July 22, 2014 | |
| INVENTOR(S) | : Alfred Y. Wong | |

It is certified that error appears in the above-identified patent and that said Letters Patent is hereby corrected as shown below:

In the Specification

Column 1, line 15, above "FIELD" the following paragraph is inserted:

--STATEMENT REGARDING FEDERALLY SPONSORED RESEARCH OR DEVELOPMENT

This invention was made with Government support under Award DE-DE-FG02-08ER84985 awarded by the Department of Energy. The Government has certain rights in this invention.--.

Signed and Sealed this
Twenty-first Day of October, 2014

Michelle K. Lee
*Deputy Director of the United States Patent and Trademark Office*